Patented Nov. 9, 1926.

1,605,927

UNITED STATES PATENT OFFICE.

VIGGO DREWSEN, OF LARCHMONT, NEW YORK.

SODIUM-MONOSULPHITE WASTE-LIQUOR-RECOVERY PROCESS.

No Drawing.   Application filed April 3, 1922.   Serial No. 549,198.

This application is a partial continuation of my copending case, Serial No. 397,484 filed July 19, 1920, Patent No. 1,511,664 from which parts of this subject matter have been taken. Other processes for the treatment of sodium monosulphite waste liquors are described in my copending applications Serial Nos. 549,195 and 549,196.

This invention relates particularly to processes for treating the waste sodium monosulphite ($Na_2SO_3$) cooking liquors which are produced in the digestion of straw, corn stalks, wood and other fibrous material for the production of paper pulp, etc., so as to recover valuable inorganic constituents of such liquors and prepare the cooking liquors for use in fibre digestion. Waste sodium monosulphite liquor from the digester is preferably concentrated as in vacuum evaporators until it contains only about the usual fifty percent of water. The concentrated liquor may then be calcined as in rotary burners with or without a preliminary dry installation to recover organic solvents therefrom and then the calcined material may be leached or dissolved to recover the soluble sodium salts usually comprising sodium hydroxide, sodium carbonate and sodium sulphide. These dissolved salts may be concentrated as in vacuum evaporators and may then be treated with carbon dioxide under pressure which may be percolated up through the solution to form and precipitate sodium bicarbonate while hydrogen sulphide is liberated and may be used in various ways as by being burned to form sulphur dioxide for recombination with the sodium bicarbonate which may, however, be transformed in various other ways into the desired sodium monosulphite for use in the cooking liquor.

Where sodium monosulphite is used as the treating liquor the soda may be recovered as by evaporating and calcining or dry distilling the waste liquor, and then leaching may be used to recover the soda in caustic, carbonate, sulphide or sulphate form. It is preferable, to treat the concentrated solution of these leached out salts with carbon dioxide under pressure, which forms and precipitates sodium bicarbonate while hydrogen sulphide is set free and may be burned to form sulphur dioxide. The sodium bicarbonate which crystallizes out in solid form may be separated by filtration and sold as such or may be treated with sodium bisulphite as in concentrated solution to form sodium monosulphite for reuse while carbon dioxide is set free. The waste liquor from the digesters after being evaporated and burned to black ash in rotary burners may, however, receive a further treatment in soapstone blast furnaces to reduce any sodium sulphate to sodium sulphide and sodium carbonate. These melted salts may then be dissolved in water and treated with carbon dioxide under pressure to produce sodium bicarbonate with evolution of hydrogen sulphide, which may be burned to form sulphur dioxide and used in producing further charges of monosulphite or other sulphites.

This invention has been described in connection with a number of illustrative materials, proportions, conditions, arrangements and orders of steps, to the details of which disclosure the invention is not of course to be limited, since what is claimed as new and what is desired to be secured by Letters Patent is set forth in the appended claims.

I claim:

1. The process of treating waste sodium monosulphite treating liquor produced in the digestion of vegetable fibrous material, which comprises drying and burning the waste liquor, dissolving out of the residue soluble sodium salts comprising sodium sulphide, and treating the sodium sulphide so as to convert the sodium into sodium bicarbonate and the sulphur into sulphur dioxid.

2. The process of treating waste sodium monosulphite treating liquor produced in the digestion of vegetable fibrous material, which comprises drying and burning the waste liquor, dissolving out of the residue soluble sodium salts, comprising treating the solution of sodium salts with carbonic acid under pressure to cause the formation of sodium bicarbonate and hydrogen sulphide, converting the hydrogen sulphide into sulphur dioxid, and utilizing the sodium bicarbonate and sulphur dioxid for the formation of freshly digesting liquor.

VIGGO DREWSEN.